Nov. 30, 1937.   L. A. YOUNG   2,100,829

DRAFTLESS VENTILATING WINDOW

Original Filed Jan. 9, 1933

*Leonard A. Young*

INVENTOR

BY *Samuel Weisman*

ATTORNEY

Patented Nov. 30, 1937

2,100,829

UNITED STATES PATENT OFFICE 2,100,829

DRAFTLESS VENTILATING WINDOW

Leonard A. Young, Detroit, Mich., assignor, by mesne assignments, to Automobile Ventilation, Inc., Detroit, Mich., a corporation of Michigan Application January 9, 1933, Serial No. 650,795
Renewed May 11, 1936

11 Claims. (Cl. 296—44)

The present invention pertains to a novel ventilating window for vehicles such as automobiles, and the principal object is to provide regulated ventilation without drafts. Although an automobile body window for the same object is now known to the art, it requires splitting the window glass, with some detriment to the general appearance of the vehicle. Accordingly, a more specific object of the invention is to provide draftless ventilation in a simpler manner and without marring the appearance of the vehicle.

In the preferred embodiment of the invention, the window is mounted to slide laterally or horizontally in its frame to form a variable space alongside the forward side of the frame. From this side extends a shield outwardly and rearwardly in a manner to project over the opening formed by the lateral adjustment. Preferably, this shield is of such dimensions as to substantially cover the maximum opening formed by this adjustment.

The movement of the vehicle produces the effect of a stream of air blown rearwardly over the shield. Such a stream creates suction at the opening, drawing air out of the vehicle and drawing fresh air inward through the various openings and cracks in the body construction. The shield further prevents direct currents of air from the exterior to the interior of the vehicle, with the result that drafts are avoided although ventilation occurs at the laterally open windows.

In another embodiment of the invention, the window may be permanently open at the forward edge, and the opening is covered by a shield such as that already mentioned. Thus, a permanent ventilating opening is provided, and the shield prevents dust and rain from being blown into the car at all times.

The invention is fully disclosed by way of example in the following description and in the accompanying drawing in which Figure 1 is a side elevation of an automobile door equipped according to the invention;

Figure 1:
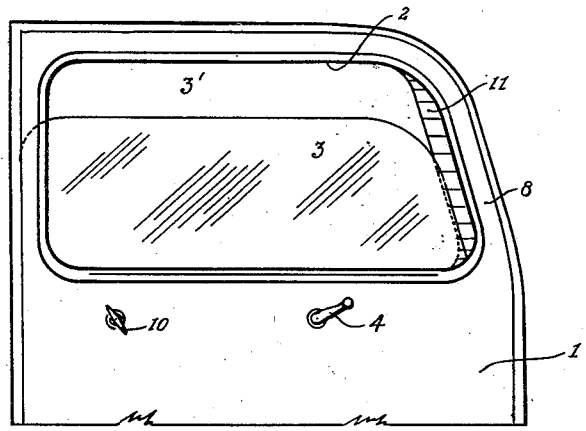
Figure 2:
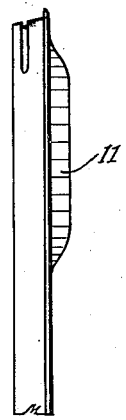
Figure 2 is an end view thereof.

In Figure 1 is illustrated a conventional automobile door 1 having the usual window opening 2. The window 3 is moved vertically to provide an adjustable top opening 3' by means of any suitable regulating mechanism which is operated by a handle 4 mounted on the inner side of the door. An opening of this type produces drafts within the vehicle, as well known, and the invention provides means of ventilation without draft, as will now be described.

Figure 3:
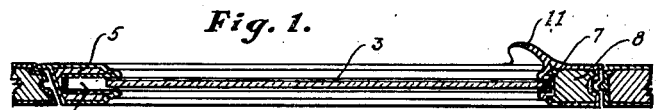
Figure 3 is a plan section of the door showing the window closed.
Figure 4:
Figure 4 is a similar section showing the window opened laterally.

The window guide channel 5 at the rearward edge of the door is about one inch deeper than usual, leaving a clearance 6 when the window is in its normal or closed position as shown in Figure 3. In this position the forward edge of the glass is received in a guide channel 7 formed in the forward sill 8. The glass is adapted to be moved laterally or horizontally so that the rear edge thereof enters the clearance 6, leaving a corresponding vertical ventilating space 9 at the forward edge as shown in Figure 4. This movement is accomplished by any suitable mechanism which is operated from a knob or handle 10 on the inner surface of the door. It will be understood that the glass may be moved as far as desired into the channel 5 and further that this construction is applicable to a body window as well as to a door window.

At the forward edge of the sill 8 is built a shield 11 projecting angularly outward in the rearward direction. The angle is of any convenient degree, preferably about 45° to the side wall of the body, and the length of the shield is such as to substantially cover the space 9 when the window is fully opened laterally.

With the window closed to its full extent vertically and opened laterally, the movement of the car induces a suction outwardly from the space 9. The suction draws air from the interior of the car, and fresh air is supplied through the various openings and cracks throughout the structure. Further, the shield 11 covering the lateral opening 9 prevents the blowing of a direct current of air from the outside into the car and also keeps out the dust, rain and snow.

If still more air is desired, the window may be lowered vertically to any desired extent. This adjustment may be accomplished with or without a lateral adjustment, as desired, inasmuch as the mechanisms operated from the handles 4 and 10 respectively are independent of each other.

Figure 5:
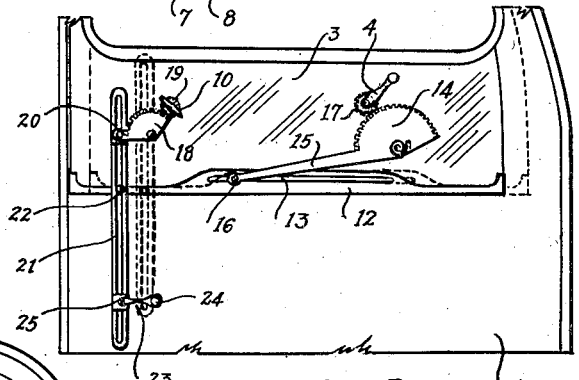
Figure 5 is a side elevation of the operating mechanism.

The mechanism for raising and lowering the window is conventional and is illustrated more fully in Figure 5. The lower edge of the glass 3 carries a rim 12 in which is formed a longitudinal slot 13. To the body of the car is pivotally mounted a toothed segment 14 from which is extended an arm 15 having a roller mounting 16 in the slot 13. A pinion 17 carried by the handle 4 meshes with the segment 14, and the turning of the handle causes a sliding movement of the roller 16 in the slot 13 accompanied by a vertical movement of the glass.

For the lateral adjustment of the window, a similar segment 18 is pivotally mounted on the body adjacent to the handle 10 and meshes with a pinion 19 carried by the handle. A finger 20 extends from the segment 18, and from this finger hangs a slotted link 21. The link slidably engages a stud 22 carried by the rim 12. An arm 23 has one end pivoted to the body at 24 and the other end pivoted to the lower end of the link at 25. The arm 23 is equal and parallel to the arm 20, so that on turning the handle 10 and segment 19, the link assumes a parallel movement. This movement causes lateral or horizontal shifting of the window 3 because of the attachment of the link 21 and the stud 22. The slidability of the stud in the link enables the ordinary vertical movement of the window. If desired, the lateral shifting mechanism may entirely be dispensed with, and the window adjusted laterally by hand.

Figure 6:
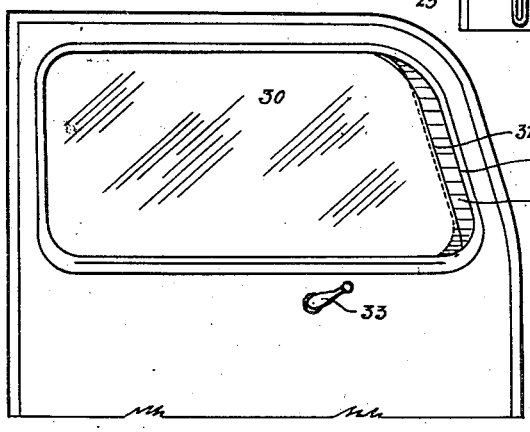
Figure 6 is a side elevation of a modified construction.

In the modification shown in Figure 6, the window 30 has its forward end permanently spaced from the forward edge 31 of the window opening, as indicated by the numeral 32. The usual handle 33 for raising and lowering the window is provided, but no handle for lateral adjustment is indicated. A shield 34 similar to the shield 11 is also provided in the same relation and for the purpose already described. This arrangement affords a permanent ventilating opening and may be provided at as many of the doors and windows as desired. In this connection it will be recognized that most drivers have at least one window open except in the most severe storms. The shield 34 in the present case, however, prevents the blowing of dust, rain or snow into the car even during storms, while on the other hand the provision of the opening prevents fogging of the window in such weather.

It will be seen that the device operates on a suction principle inasmuch as the passage of the stream of air over the shield 11 causes a drop in pressure at the space 9. Thus, air is withdrawn from the vehicle wherever a space 9 is formed by opening the window laterally. Fresh air is drawn into the vehicle at all points that are not sealed, for example, between the floor boards, through the cowl and through cracks around the doors. The incoming supply of air is gradual and yet sufficient to change the air in the car at a comfortable rate without producing drafts.

Although specific embodiments of the invention have been illustrated and described, it will be understood that various alterations in the details of construction may be made without departing from the scope of the invention as indicated by the appended claims.

What I claim is:

1. In a vehicle body, the combination of a window formed from a piece of glass, a frame for said window constructed so as to maintain a substantially tight joint between the front edge of the window and the front upright member of the frame, the window being adapted to be moved vertically or substantially so, means for moving said window horizontally to produce a ventilating opening adjacent to the front edge of same through which air is sucked from the interior of the body by the natural vacuum produced on said ventilating opening by external air currents, when the vehicle is moving forwardly, and means for moving said window horizontally to cut off the escape of air from the body through said ventilating opening.

2. A vehicle body having a side window opening provided with a frame comprising opposed grooved front and rear upright members, a window panel for said opening slidable vertically in said grooves, one of the grooves being of such depth as to permit limited horizontal movement of the panel when it is in its raised position to provide a vertical slot-like ventilating opening between the panel and one of the uprights, and means manually operable from the inside of the vehicle for adjusting said panel to raise and lower it or to provide such a ventilating opening.

3. In a vehicle body, the combination of a window frame having a window opening, a window formed from a glass panel adapted to entirely fill said opening, said frame being constructed so as to provide a substantially tight joint between the front edge of the panel and the front upright member of the frame, the window being adapted to be moved in a vertical path or substantially so, and means for moving said window in its plane angularly with respect to said vertical path and in opposite directions to produce and close a ventilating opening adjacent to the front edge thereof through which air is sucked from the interior of the body by the natural partial vacuum produced exteriorly of said ventilating opening by external air currents.

4. In a vehicle body, the combination of a window formed from a piece of glass, a frame for said window constructed so as to maintain a substantially tight joint between the front edge of the window and the front upright member of the frame, the window being adapted to be moved vertically or substantially so, means for moving said window in its plane longitudinally of the vehicle to produce a ventilating opening adjacent to the front edge of same through which air is sucked from the interior of the body by the natural vacuum produced on said ventilating opening by external air currents, when the vehicle is moving forwardly, and means for moving said window in its plane longitudinally of the vehicle to cut off the escape of air from the body through said ventilating opening.

5. A vehicle body having a side window opening provided with a frame comprising opposed grooved front and rear upright members, a window panel for said opening slidable vertically or substantially so in said grooves, one of the grooves being of such depth as to permit limited longitudinal movement of the panel in its plane when it is in its raised position to provide a vertical upright slot-like ventilating opening between the panel and one of the uprights, and means manually operable from the inside of the vehicle for adjusting said panel to raise and lower it or to provide such a ventilating opening.

6. A window construction for a vehicle body having a window frame in a side wall thereof providing a window opening, said frame having a relatively shallow glass runway at its forward upright edge and a relatively deep glass runway at its rear upright edge, a window glass adapted to entirely close said opening and mounted to be raised and lowered in said runway, said glass also being adapted to move longitudinally in its plane into said deep glass runway to provide a ventilating slot or opening between the forward upright edge of the glass and said shallow runway whereby air may be exhausted from the interior of the body during the forward travel thereof.

7. A window construction for a vehicle body having a window frame in a side wall thereof providing a window opening, said frame having a relatively shallow glass runway at its forward upright edge and a relatively deep glass runway at its rear upright edge, a window glass adapted to entirely close said opening and mounted to be raised and lowered in said runway, said glass also being adapted to move longitudinally in its plane into said deep glass runway to provide a ventilating slot or opening between the forward upright edge of the glass and said shallow runway whereby air may be exhausted from the interior of the body during the forward travel thereof, regulator mechanism connected to the lower edge of the glass for sliding the glass rearwardly and forwardly in its plane into and out of ventilating position when the glass is elevated.

8. A window construction for a vehicle body having a window frame in a side wall thereof providing a window opening, said frame having a relatively shallow glass runway at its forward upright edge and a relatively deep glass runway at its rear upright edge, a window glass adapted to entirely close said opening and mounted to be raised and lowered in said runway, said glass also being adapted to move longitudinally in its plane into said deep glass runway to provide a ventilating slot or opening between the forward upright edge of the glass and said shallow runway whereby air may be exhausted from the interior of the body during the forward travel thereof, means for raising and lowering said glass, and means for moving said glass longitudinally in its plane.

9. In a vehicle body, the combination of a window frame having an opening and a window glass in said frame, guideways in the frame for guiding the glass in an upright path during the raising and lowering movements of the glass, said window glass being of greater width than the frame opening but of lesser width than the distance between said guideways, means for raising and lowering the glass to close and open said window opening, and means for shifting said glass horizontally in its plane to produce a ventilating opening between one upright edge of the glass and the window frame when the glass is substantially fully raised.

10. In a vehicle body having a window frame and a window opening, window glass raising and lowering mechanism mounted in said body, a window glass in said frame adapted to be moved horizontally into and out of position to provide a ventilating opening through which air may be exhausted from the vehicle during its travel, said glass being adapted to be raised and lowered by said mechanism, and mechanism separate from the first named mechanism and operable when the window glass is in fully raised position to move said glass into ventilating position.

11. In a vehicle body having a window frame and a window opening, window glass raising and lowering mechanism mounted in said body, a window glass in said frame adapted to be moved horizontally into and out of position to provide a ventilating opening through which air may be exhausted from the vehicle during its travel, said glass being adapted to be raised and lowered by said mechanism, mechanism separate from the first named mechanism and operable when the window glass is in fully raised position to move said glass longitudinally of the vehicle into ventilating position, and a handle on the vehicle body to operate said last named mechanism.

LEONARD A. YOUNG.